(12) United States Patent
Salvaji et al.

(10) Patent No.: US 8,897,451 B1
(45) Date of Patent: Nov. 25, 2014

(54) STORING SECURE INFORMATION USING HASH TECHNIQUES

(71) Applicant: MGM Resorts International, Las Vegas, NV (US)

(72) Inventors: Rajeshwar Salvaji, Henderson, NV (US); Mudit Chandra, Henderson, NV (US)

(73) Assignee: MGM Resorts International, Las Vegas, NV (US)

( * ) Notice: Subject to any disclaimer, the term of this patent is extended or adjusted under 35 U.S.C. 154(b) by 0 days.

(21) Appl. No.: 14/079,519

(22) Filed: Nov. 13, 2013

(51) Int. Cl.
*G06F 21/00* (2013.01)
*G06F 21/62* (2013.01)

(52) U.S. Cl.
CPC .................. *G06F 21/6218* (2013.01)
USPC .......................................... 380/277; 713/167

(58) Field of Classification Search
None
See application file for complete search history.

(56) References Cited

U.S. PATENT DOCUMENTS

| | | | |
|---|---|---|---|
| 7,240,209 B2 * | 7/2007 | Carro | 713/179 |
| 8,360,313 B1 | 1/2013 | Leon et al. | |
| 2001/0007975 A1 * | 7/2001 | Nyberg et al. | 705/1 |
| 2003/0130955 A1 | 7/2003 | Hawthorne | |
| 2004/0236953 A1 | 11/2004 | Merenne et al. | |
| 2006/0053112 A1 | 3/2006 | Chitkara et al. | |
| 2009/0083545 A1 * | 3/2009 | Heim et al. | 713/189 |
| 2010/0011423 A1 * | 1/2010 | Isobe et al. | 726/5 |
| 2010/0158242 A1 * | 6/2010 | Asher | 380/28 |
| 2010/0211787 A1 | 8/2010 | Bukshpun et al. | |
| 2012/0214577 A1 * | 8/2012 | Petersen et al. | 463/25 |

OTHER PUBLICATIONS

Oracle, Oracle Database, "Advanced Security Administrator's Guide, 11g Release 1 (11.1), Chapter 3, Securing Stored Data Using Transparent Data Encryption", Jul. 2012.
U.S. Appl. No. 14/079,493; Office Action mailed Feb. 28, 2014.

* cited by examiner

*Primary Examiner* — David Le
(74) *Attorney, Agent, or Firm* — Lewis Roca Rothgerber LLP (57) ABSTRACT

Sensitive information is hashed using a hash key, salting key and additional logic. Upon receiving a credit card authorization request with a credit card number (or other sensitive information), the present technology may select a hash key. The credit card number may then be hashed using the hash key. A cryptographic salting key may be selected and salting modification logic may be accessed. The selected salting key may then be applied to the hashed credit card number. After the salting, the salting modification logic may be applied to the salted hash string. The resulting hash output may be used as an index to store encrypted credit card information with authorization information, settlement information, and other data within one or more tables.

19 Claims, 8 Drawing Sheets

| Index | Auth Code | Encrypted CC |
|---|---|---|
| 32145 | T4E33 | 34D238990CA89 |
| 34511 | T3R67 | 2A498547C3B31 |
| 22356 | 45JP1 | B3A98CD39103A |

FIGURE 3A

| Index | Settlement Info | Encrypted CC |
|---|---|---|
| 32145 | 100 | 34D238990CA89 |
| 34511 | 150 | 2A498547C3B31 |
| 22356 | 200 | B3A98CD39103A |

STORING SECURE INFORMATION USING HASH TECHNIQUES

REFERENCE TO RELATED APPLICATIONS

The present application is related to U.S. patent application Ser. No. 14/079,493, titled "Data Encryption Using Secure Encryption Methods," filed on Nov. 13, 2013, the disclosure of which is incorporated herein by reference.

BACKGROUND

Businesses that offer services to large numbers of people often have access to large amounts of sensitive information. For example, many businesses perform thousands or millions of credit card transactions each year. Credit card information is just one example of sensitive information that many companies handle as part of providing a service. Often times, large amounts of data must be stored and accessed quickly as part of providing services involving sensitive information.

Currently existing methods for storing and accessing large amounts of sensitive information have disadvantages. Typically, when the information includes millions of records, the information is stored by a unique number, for example by consecutively numbered records This allows for easy storage, but accessing the information at a later date can be time consuming when there are large numbers of records, for example in the millions.

It is important for businesses to be able to quickly store and access any record of a large amount of records including sensitive information such as credit card information.

SUMMARY

The present technology securely hashes information using a hash key, salting key and additional secured logic. Upon receiving credit card authorization request with a credit card number (or other sensitive or valuable information), the present technology may select a hash key. The credit card number may then be hashed using the hash key A cryptographic salting key may be selected and salting modification logic may be accessed. The selected salting key may then be applied to the hashed credit card number. After the salting, the salting modification logic may be applied to the salted hash string. The resulting hash output may be used as an index to store encrypted credit card information with authorization information, settlement information, and other data within one or more tables. The hashing of sensitive information and storage based on the hashing output allows information to be stored and accessed quickly.

In an embodiment, a method begins with receiving a request including a string of information. A hash key and a salt key are selected and logic to modify the salt key is accessed. A hash is performed to the string of information using the hash key, salt key and logic to determine a hash index. The string of information is stored with the hash index in a table, wherein the string of information is associated with the hash index in the table.

In embodiments, the method described above may be performed by systems including application servers and data stores. Additionally, one or more modules stored on memory may be executable by one or more processors to perform the above method.

DETAILED DESCRIPTION

The present technology securely hashes information using a hash key, salting key and additional secured logic. Upon receiving credit card authorization request with a credit card number (or other sensitive or valuable information), the present technology may select a hash key. A cryptographic salting key may be selected and salting modification logic may be accessed. The selected salting key may then be applied to the hashed credit card number. After the salting, the salting modification logic may be applied to the salted hash string. The modified salted credit card number may then be hashed using the hash key. The resulting hash output may be used as an index to store encrypted credit card information with authorization information, settlement information, and other data within one or more tables.

The hashing of sensitive information and storage based on the hashing output allows information to be stored and accessed quickly. By adding salting via a salt key and additional logic, the resulting hash values provide a higher level of security. When used with credit card information, credit card authorizations and settlement requests may be stored in one or more tables when credit card numbers are hashed using the hash key, salt key and logic.

Though the present technology may be discussed herein with respect to credit card numbers and casinos, other information may be hashed using techniques and systems described herein for entities other than casinos.

Figure 1:
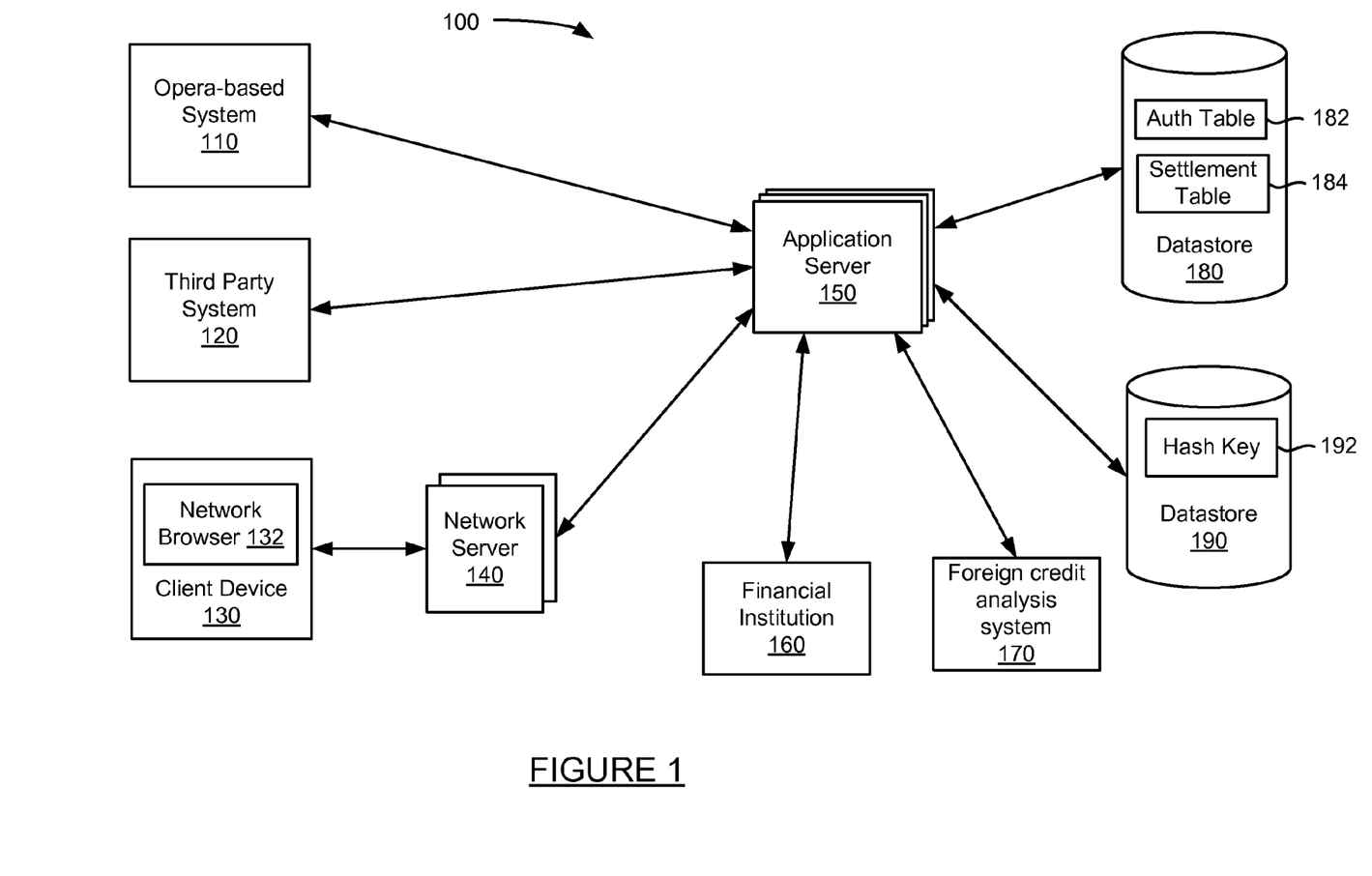
FIG. 1 illustrates a system for using a hash to store and access information.

FIG. 1 illustrates a system for using a hash to store and access information. System 100 of FIG. 1 includes OPERA-based remote system 110, third party remote system 120, client device 130, network server 140, application server 150, financial institution 160, database 180, and database 190.

Each of systems 110-120, client device 130, servers 140-150, systems 160-170, and data stores 180 and 90 may communicate over one or more networks. The networks may be any network suitable to facilitate communication of data between different servers, devices and machines. The one or more networks may be implemented as a private network, public network, intranet, the Internet, a cellular network, Wi-Fi network, VoIP network, or a combination of one or more of these networks.

Each of servers 140 and 150 and data stores 180-190 may be implemented as one physical machine or multiple physical machines. The servers and data stores may be implemented as logically separate servers and data stores or combined into fewer logical servers and data stores than those illustrated in system 100.

OPERA based system 110 may include one or more systems for communicating reservations with application server 150. For example, the system 110 may be implemented by an external business that sends authorization requests and reservation requests with credit card numbers and other data to application server 150.

Third party remote system 120 may also communicate sensitive information such as authorization requests and settlement requests with credit card numbers to application server 150. For example, when application server 150 is implemented by a casino, the third party remote system 120 may be implemented by a partner such as a restaurant, event ticketing service, or other service which may transmit sensitive information to the casino.

Client device 130 may communicate with application server 150 via one or more network servers 140. Client device 130 may be implemented as any computing device which may communicate or be configured to communicate over a network, such as for example a laptop, desktop, workstation, smart phone, tablet computer or other computing device. Client device 130 may include a network browser 132 through which the client may communication with a network service provided by server 150. Network browser 110 may be a client application for viewing content provided by an application server, such as application server 150, via network server 140.

Network server 140 may receive and process requests received from client device 130 and sent by application server 150. When a network of communication is the Internet, network server 125 may be implemented as one or more web server. In some embodiments, network server 125 and application server 130 may be implemented as a single server, or include multiple machines that each implement a network server and an application server.

Application server 150 may communicate with network systems 110-120, client device 130, network servers 140, systems 160-170, and data stores 180-190. Application server 130 may also communicate with other machines and devices (not illustrated in FIG. 1). Application server 130 may host an application, one or more portions of a distributed application and other software modules that may be executed to perform the functionality discussed herein.

Application server 150 may include one or more applications that may encrypt information such as credit card information, perform a hash on information such as a credit card number, and perform other features discussed herein. When performing a hash, keys for the hash and other data may be stored at server 150 or remotely at data stores 180-190. An application on application server 150 may access one or more hash keys, salting information and other logic for performing a hash on data. Once encrypted or a hash is performed, the results may be stored remotely at database 170.

Data store 180 may include an authorization table 182, settlement table 184 and other data. Data store 180 may modify, add, delete and generate the tables based on instructions received from application server 150 and other sources. Data store 192 may include hash keys 192. The hash keys may include primary encryption process keys such as keys used for advanced encryption standard (AES) encryption and salting keys.

Though illustrated as remote machines to application server 150, databases 160 and 170 may each or both be stored locally, for example as logically separate data stores, on application server 150.

Application server 150 may receive settlement requests and authorization requests from services provided by systems 110 and 120 and may periodically send a batch of the settlements to financial institution 160. The batch settlements may be sent using FTP protocol or some other protocol to financial institution 190. In some embodiments, the batch of settlements may be sent daily, monthly, or based on some other event.

Figure 2:
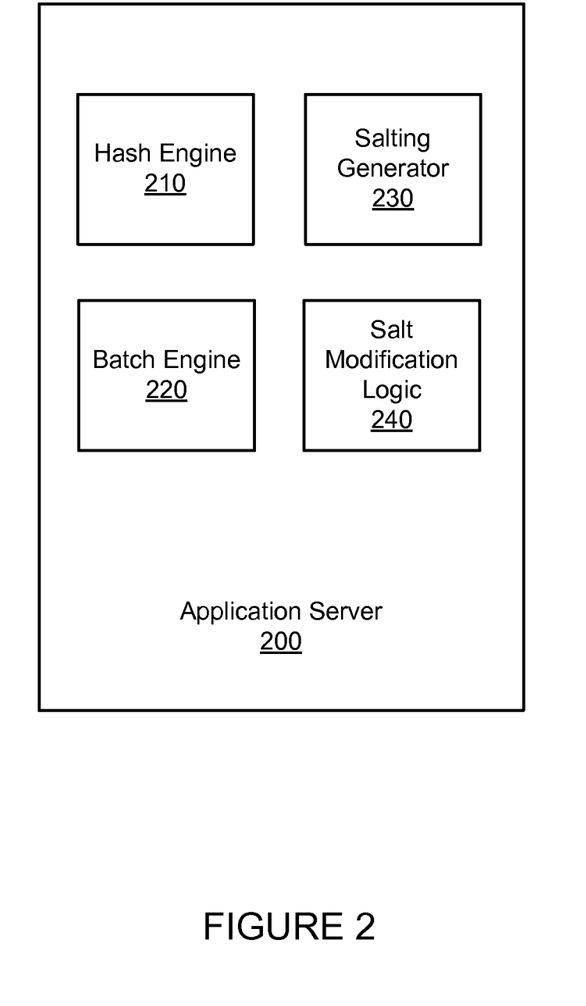
FIG. 2 illustrates a block diagram of an application server.

FIG. 2 illustrates a block diagram of an application server 200. The application server of FIG. 2 may be implement server 150 of the system of FIG. 1. Application server 200 of FIG. 2 includes executable modules hash engine 210, batch engine 220, random salting generator 230, and salt modification logic 240. Hash engine 210 may perform a hash on information received from an external service. For example, when a third party service 110 or 120 sends an authorization request or a settlement request to application server 150 which includes a credit card number, hash engine 210 may perform a hash on the credit card number. In some instances, the credit card number may first be salted and the salted credit card may be modified before the credit card number is hashed.

Batch engine 220 may retrieve decrypted information and send the decrypted information as a batch of settlements to financial institution 160. The batch of information may be sent in response to an event such as a scheduled transmission, user request, or other event.

A salt process may be performed by salting generator 230 to a credit card number before it is hashed. The salt process may be applied to a credit card received from a remote source. For example, the salting process may apply a salting key to add characters to the received credit card number.

Salt modification logic 240 may replace particular characters in a credit card string, such as for example a credit cards string that has been salted with a salt key, with other characters. Salt modification logic 240 may further modify the salting performed on the hash engine, for example, by replacing selected values in a salted credit card string t with other values. The logic may be stored in and applied by an application that implements salt modification logic 240.

Figure 3A:
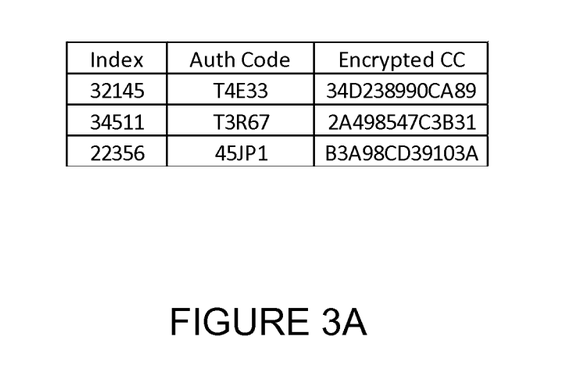
FIG. 3A illustrates an exemplary authorization table.

FIG. 3A illustrates an exemplary authorization table. The authorization table as illustrated includes columns for an index, authorization code, and encrypted credit card data. An authorization table may include other information in addition to that illustrated in FIG. 3A.

The index may be an output of a hash process, which may include a hash, salting and additional logic, performed on a credit card number provided in an authorization request. When the same credit card number is hashed using the same hash process, the same index will be created. Though there may be different entries for each authorization request, each authorization request for a particular credit card will have the same index number. The authorization code may include the code that is provided from a financial institution. The code may represent the amount for which the credit card number is authorized. The encrypted credit card number may be stored for each index and associated authorization code.

Figure 3B:
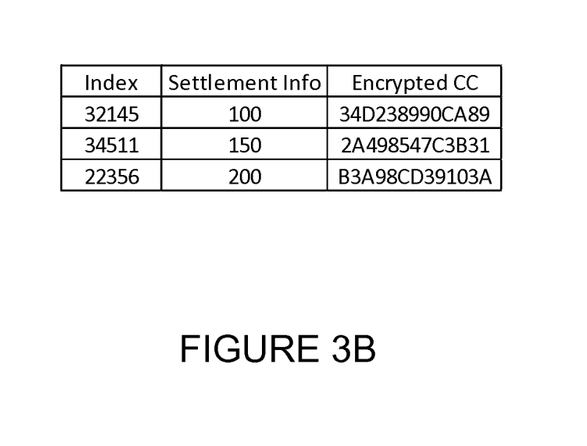
FIG. 3B illustrates an exemplary authorization table.

FIG. 3B illustrates an exemplary settlement table. The settlement table of FIG. 3B includes columns of index, settlement information, and encrypted credit card. Other data may also be included in a settlement table as used with the present technology.

The index data in the settlement table may be an output of a hash process, which may include a hash, salting and additional logic. The hash process may be performed on a credit card number provided in a settlement request. When the same credit card number is hashed using the same hash process, the same index will be created. Though there may be different entries for each settlement request, each settlement request for a particular credit card will have the same index number. As such, all settlements for a particular card may be retrieved by performing hash of the card.

The settlement information may include information received in a settlement request. The settlement information may include for example an amount of a settlement against a credit card. The encrypted credit card number may be stored for each index and associated authorization code.

Figure 4:
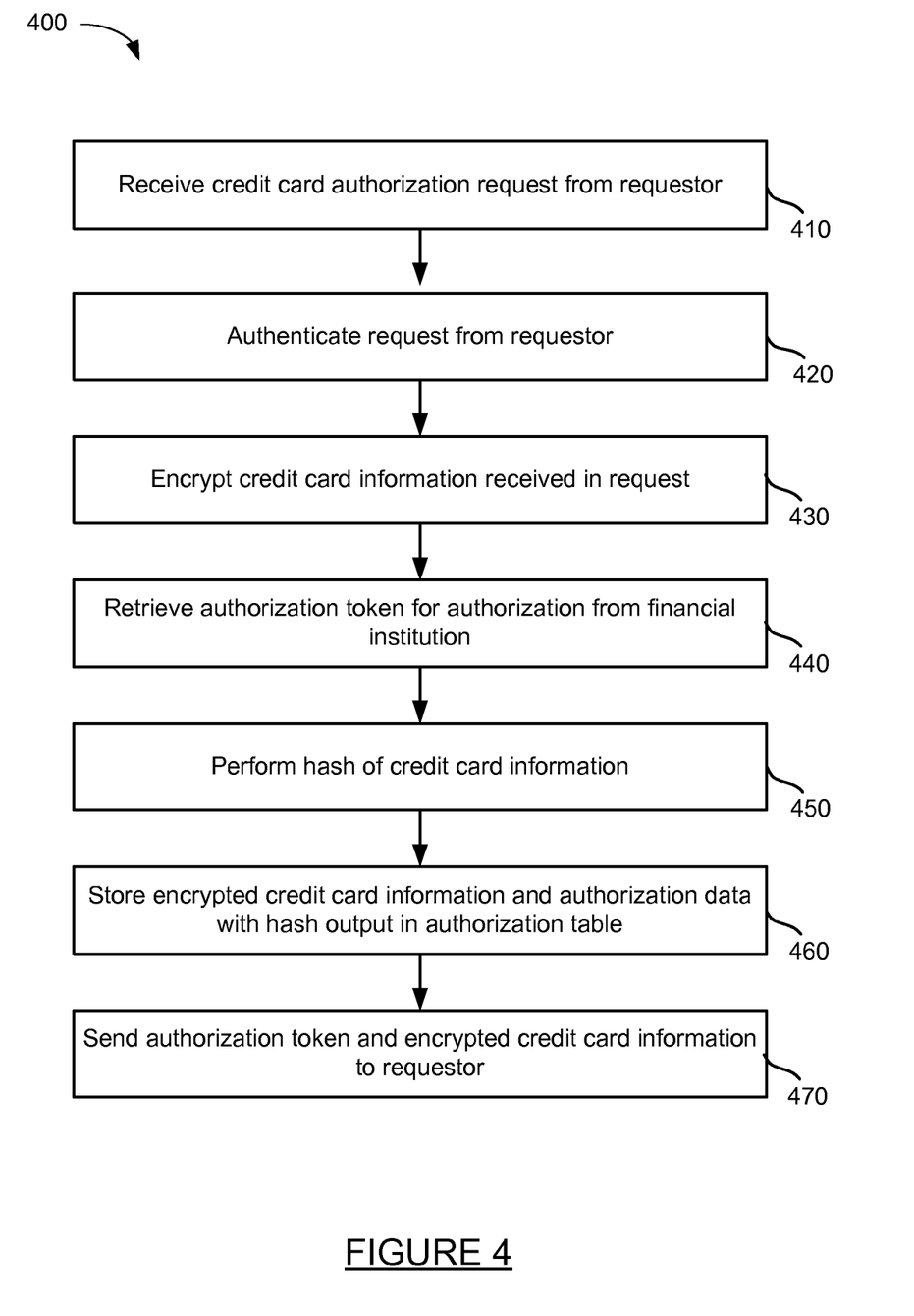
FIG. 4 illustrates a method for processing and storing authorization requests.

FIG. 4 illustrates a method for processing and storing authorization requests. First, a credit card authorization request is received from a requestor at step 410. The authorization request may include the credit card itself, an amount to be authorized, and other information for the credit card such as a user name and an expiration date for the credit card. The request may be authenticated at step 420. Authentication is performed to ensure the request is received from a reliable source. A reliable source may be identified by recognizing an IP address from which the authorization request is received, detecting a code placed in a header of the request, or other methods. The code may be associated with a particular source and provided to the requestor by the administrator of application server 150.

Once the request is authenticated, the credit card information is encrypted at step 430. The credit card may be encrypted using a multi-step randomly generated encryption process. An exemplary encryption process described in more detail in patent application Ser. No. 14/079,493, titled "Data Encryption Using Secure Encryption Methods," filed on Nov. 13, 2013, the disclosure of which is incorporated herein by reference.

An authorization token may be retrieved from a financial institution at step 430. An authorization request with credit card information and a desired may be sent to financial institution 160. In response, financial institution 160 may approve the request and send an authorization token, deny the request, or provide other information. Assuming the request is approved, the authorization token is sent in the financial institutions response to application server 150.

A hash is performed on the credit card information at step 450. The hash may involve performing salting to the credit card number, applying additional logic to the salted credit card number, and performing a hash to the modified salted credit card number. More details for performing a hash are discussed with respect to the method of FIG. 5.

Encrypted credit card information is stored with authorization data and a hash output in an authorization table at step 460. The authorization data may include the authorization token as well as information which may be used to decrypt the credit card number. The authentication token and the encrypted string generated from the credit card may be transmitted to the requesting party that requested the authorization request at step 470.

Figure 5:
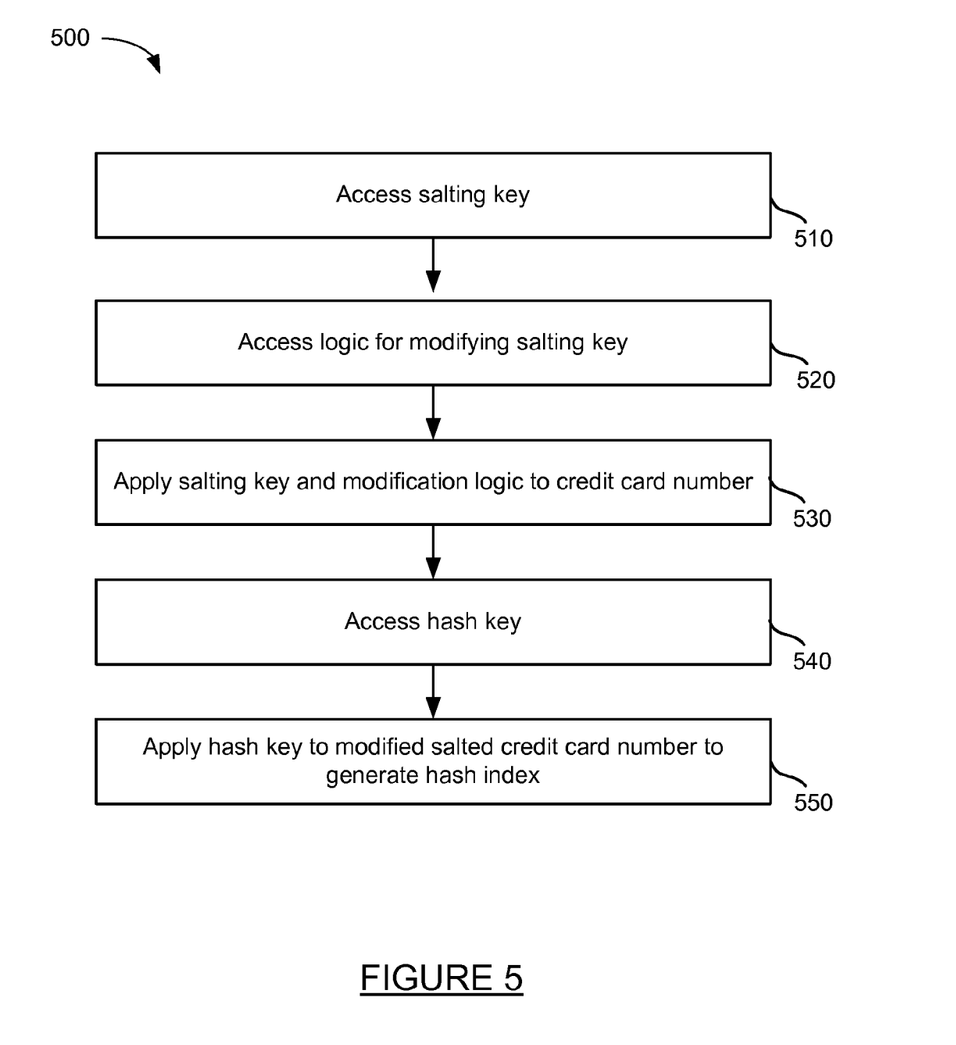
FIG. 5 illustrates a method for performing a hash.

FIG. 5 illustrates a method for performing a hash. In some embodiments, the method of FIG. 5 provides more detail for step 450 in the method of FIG. 4. A salting key is selected at step 510. The salting key may be accessed by salting generator 230 from a remote location such as data store 190. Logic to modify may be accessed at step 520. In some instances the logic for modifying a salted key is stored in an applied by an application rather than being accessed from a location external to an application. An example of an application that includes and applies salt modification logic is salt modification logic application 240. The salting key and logic for modifying the salting may be applied to hashed credit card number at step 530. Applying the salting key to the credit card string results in additional characters being added to the string. Applying the logic to the salted credit card string may result in replacing characters within the string with other characters. For example, the third, eighth and tenth character in the salted credit card string may be replaced by predetermined characters by application logic.

After applying the salt key and modification logic, a hash key is selected at step 540. The selected hash key may be applied to the credit card number to generate an index at step 520. The resulting index may be stored as the hash output along with an encrypted credit card information and authorization data at step 460 of the method of FIG. 4.

Figure 6:
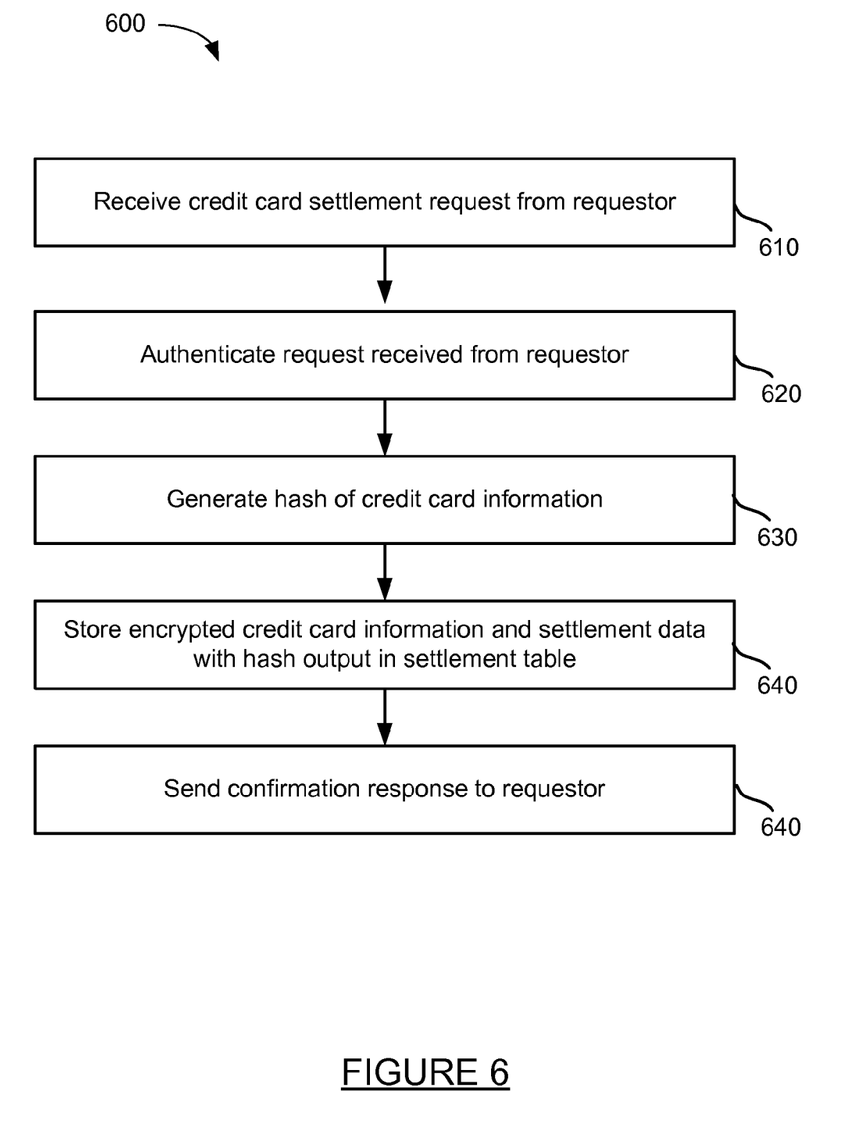
FIG. 6 illustrates a method for processing a settlement request.

FIG. 6 is a method for processing a settlement request. First, a settlement request is received at step 610. The settlement request may include an authentication token and encrypted credit card information. The settlement request may be authenticated at step 620. The request may be authenticated based on an IP address of the requestor, a code or other information included in the request header or other portion of the request, or in some other manner.

Credit card information may be hashed at step 630. The hash may be performed on a credit card number or other data. The settlement request may be stored at step 640. The settlement data may be stored in a settlement table along with the encrypted credit card data and the hash output. A response to the settlement request is generated and transmitted to the requestor at step 640. The response may confirm the request receipt as well the status of the request.

Figure 7:
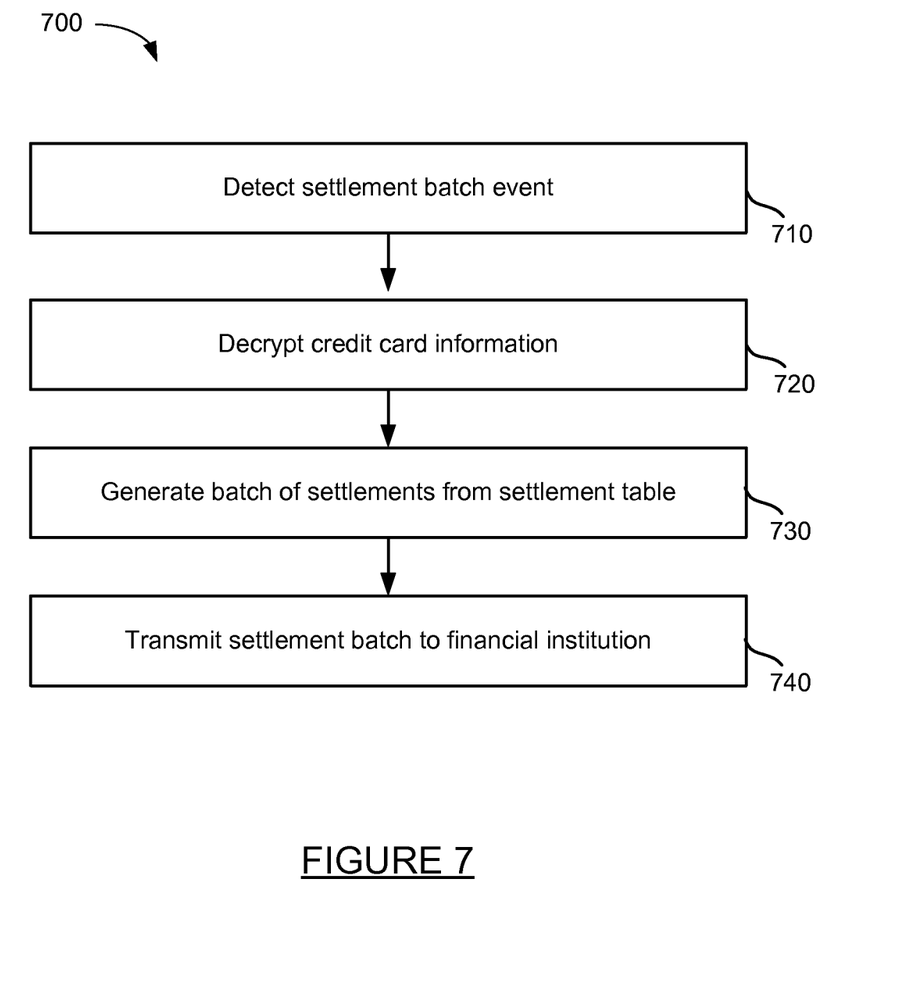
FIG. 7 illustrates a method for processing a batch of settlements.

FIG. 7 illustrates a method for processing a settlement batch. First, a settlement batch event is detected at step 710. The event may be associated with a trigger that occurs on a daily basis, an event such as the accumulation of a certain number of settlements, a request from a financial institution, a user request to send the settlements, or some other event. Upon detecting a settlement batch event, credit card information is decrypted along with other information from the settlement table at step 720. A batch of settlements is then created from the decrypted credit cards and other settlement information at step 730. The generated batch is then transmitted to financial institution 160 from the application server 150 at step 740. The financial institution 160 may send a response to the application server to confirm that the batch was received. The batch may be sent in any number of protocols per the financial institution interface, such as for example using FTP protocol.

Figure 8:
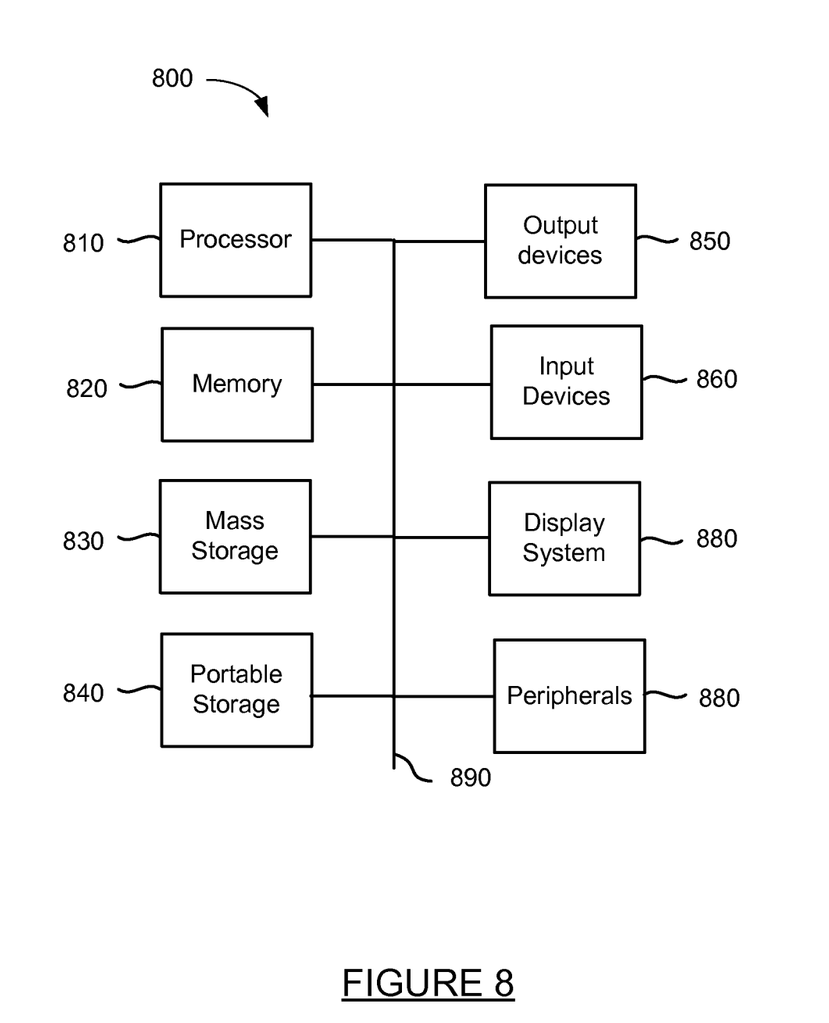
FIG. 8 illustrates a computing environment for implementing the present technology.

FIG. 8 is a block diagram of an exemplary computing system for implementing the present technology. System 800 of FIG. 8 may be implemented for computing devices such as the contexts of the likes of OPERA-based remote system 110, third party remote system 120, client device 130, network server 140, application server 150, financial institution 160, database 180, and database 190. The computing system 800 of FIG. 8 includes one or more processors 810 and memory 820. Main memory 820 stores, in part, instructions and data for execution by processor 810. Main memory 820 can store the executable code when in operation. The system 800 of FIG. 8 further includes a mass storage device 830, portable storage medium drive(s) 840, output devices 850, user input devices 860, a graphics display 870, and peripheral devices 880.

The components shown in FIG. 8 are depicted as being connected via a single bus 890. However, the components may be connected through one or more data transport means. For example, processor unit 810 and main memory 820 may be connected via a local microprocessor bus, and the mass storage device 830, peripheral device(s) 880, portable storage device 840, and display system 870 may be connected via one or more input/output (I/O) buses.

Mass storage device 830, which may be implemented with a magnetic disk drive or an optical disk drive, is a non-volatile storage device for storing data and instructions for use by processor unit 810. Mass storage device 830 can store the system software for implementing embodiments of the present invention for purposes of loading that software into main memory 820.

Portable storage device 840 operates in conjunction with a portable non-volatile storage medium, such as a floppy disk, compact disk or Digital video disc, to input and output data and code to and from the computer system 800 of FIG. 8. The system software for implementing embodiments of the present invention may be stored on such a portable medium and input to the computer system 800 via the portable storage device 840.

Input devices 860 provide a portion of a user interface. Input devices 860 may include an alpha-numeric keypad, such as a keyboard, for inputting alpha-numeric and other information, or a pointing device, such as a mouse, a trackball, stylus, or cursor direction keys. Additionally, the system 800 as shown in FIG. 8 includes output devices 850. Examples of suitable output devices include speakers, printers, network interfaces, and monitors.

Display system 870 may include a liquid crystal display (LCD) or other suitable display device. Display system 870 receives textual and graphical information, and processes the information for output to the display device.

Peripherals 880 may include any type of computer support device to add additional functionality to the computer system. For example, peripheral device(s) 880 may include a modem or a router.

The components contained in the computer system 800 of FIG. 8 are those typically found in computer systems that may be suitable for use with embodiments of the present invention and are intended to represent a broad category of such computer components that are well known in the art. Thus, the computer system 800 of FIG. 8 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for storing data, comprising:
   receiving a request including a string of information;
   selecting a hash key;
   selecting a salt key;
   accessing logic to modify the salt key;
   performing a hash to the string of information using the hash key, salt key and logic to determine a hash index; and
   storing the string of information with the hash index in a table, wherein the string of information is associated with the hash index in the table, and wherein the string of information stored with the hash index includes an encrypted version of the string.

2. The method of claim 1, wherein the string of information includes a credit card number.

3. The method of claim 1, wherein the request is an authorization request and the table includes an authorization table.

4. The method of claim 1, wherein the request is a settlement request and the table includes a settlement table.

5. The method of claim 1, further comprising:
   receiving a request for information associated with the string of information;
   performing a hash on the string of information to determine a second hash index; and
   accessing information stored in the table and associated with the second hash index.

6. The method of claim 1, wherein the logic includes replacing selected characters in the encrypted string with a value.

7. The method of claim 6, wherein the value is predetermined.

8. The method of claim 1, wherein the request is received and processed by a casino.

9. The method of claim 1, wherein the string of information includes a credit card received as payment by an external business.

10. A non-transitory computer readable storage medium having embodied thereon a program, the program being executable by a processor to perform a method for storing data, the method comprising:
    receiving a request including a string of information;
    selecting a hash key;
    selecting a salt key;
    accessing logic to modify the salt key;
    performing a hash to the string of information using the hash key, salt key and logic to determine a hash index; and
    storing the string of information with the hash index in a table, wherein the string of information is associated with the hash index in the table, and wherein the string of information stored with the hash index includes an encrypted version of the string.

11. The non-transitory computer readable storage medium of claim 10, wherein the string of information includes a credit card number.

12. The non-transitory computer readable storage medium of claim 10, wherein the request is an authorization request and the table includes an authorization table.

13. The non-transitory computer readable storage medium of claim 10, wherein the request is a settlement request and the table includes a settlement table.

14. The non-transitory computer readable storage medium of claim 10, the non-transitory computer readable storage medium further comprising:
    receiving a request for information associated with the string of information;
    performing a hash on the string of information to determine a second hash index; and
    accessing information stored in the table and associated with the second hash index.

15. The non-transitory computer readable storage medium of claim 10, wherein the logic includes replacing selected characters in the encrypted string with a value.

16. The non-transitory computer readable storage medium of claim 15, wherein the value is predetermined.

17. The non-transitory computer readable storage medium of claim 10, wherein the request is received and processed by a casino.

18. The non-transitory computer readable storage medium of claim 10, wherein the string of information includes a credit card received as payment by an external business.

19. A system for encrypting data, comprising:
    a processor;
    memory; and one or more software modules stored in the memory and executed by the processor to receive a request including a string of information, select a hash key, select a salt key, access logic to modify the salt key, performing a hash to the string of information using the hash key, salt key and logic to determine a hash index, and store the string of information with the hash index in a table, wherein the string of information is associated with the hash index in the table, and wherein the string of information stored with the hash index includes an encrypted version of the string.

\* \* \* \* \*